(12) United States Patent
Takai

(10) Patent No.: US 11,668,591 B2
(45) Date of Patent: Jun. 6, 2023

(54) ROTATION DETECTING DEVICE

(71) Applicant: KABUSHIKI KAISHA TOKAI RIKA DENKI SEISAKUSHO, Aichi (JP)

(72) Inventor: Yuji Takai, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 182 days.

(21) Appl. No.: 16/170,609

(22) Filed: Oct. 25, 2018

(65) Prior Publication Data
US 2019/0137304 A1 May 9, 2019

(30) Foreign Application Priority Data

Nov. 6, 2017 (JP) .............................. JP2017-213622

(51) Int. Cl.
*G01D 5/34* (2006.01)
*G01D 5/347* (2006.01)
*G01D 5/244* (2006.01)

(52) U.S. Cl.
CPC ....... *G01D 5/3473* (2013.01); *G01D 5/24461* (2013.01)

(58) Field of Classification Search
CPC .......................... G01D 5/24461; G01D 5/3473
USPC ................................................... 250/231.16
See application file for complete search history.

(56) References Cited

U.S. PATENT DOCUMENTS

| 5,821,531 A | * | 10/1998 | Nomura | G02B 7/08 250/231.13 |
| 5,973,320 A | * | 10/1999 | Maruyama | G01B 11/26 250/214 PR |
| 8,836,268 B2 | | 9/2014 | Yoshida | |
| 10,509,480 B2 | | 12/2019 | Mega | |
| 2006/0049964 A1 | * | 3/2006 | Berthou | G01D 5/24461 341/13 |

(Continued)

FOREIGN PATENT DOCUMENTS

| EP | 874224 A2 * 10/1998 ........... G01D 5/3473 |
| JP | 2001-50777 A 2/2001 |

(Continued)

*Primary Examiner* — Tony Ko
(74) *Attorney, Agent, or Firm* — Thomas W. Cole; Calderon Safran & Cole, P.C.

(57) ABSTRACT

A rotation detecting device includes a rotation operation part configured to be rotationally operated, a first detector configured to detect a rotation of the rotation operation part and output a first rotation detection signal, a second detector configured to output a second rotation detection signal, with a predetermined phase difference with respect to the first rotation detection signal, a third detector configured to output a third rotation detection signal, with each of a predetermined phase difference with respect to the first rotation detection signal of the first detector and a phase difference with respect to the second rotation detection signal of the second detector, and a controller configured to, based on the first rotation detection signal, the second rotation detection signal, and the third rotation detection signal, perform detection of a failure of the first detector, the second detector, or the third detector.

14 Claims, 7 Drawing Sheets

(56) References Cited

U.S. PATENT DOCUMENTS

| | | | | |
|---|---|---|---|---|
| 2008/0186491 A1* | 8/2008 | Baxter | ............... | G01D 5/3473 |
| | | | | 356/364 |
| 2010/0076643 A1* | 3/2010 | Kim | ............... | B62D 5/049 |
| | | | | 701/31.4 |
| 2011/0202308 A1* | 8/2011 | Kishida | ............... | G01B 7/30 |
| | | | | 702/151 |
| 2011/0303831 A1* | 12/2011 | Nagura | ............... | G01D 5/3473 |
| | | | | 250/231.14 |
| 2012/0158340 A1* | 6/2012 | Ueda | ............... | G01D 5/244 |
| | | | | 702/94 |
| 2013/0076290 A1 | 3/2013 | Yoshida | | |
| 2016/0375269 A1* | 12/2016 | Michaud | ............... | A61B 6/032 |
| | | | | 600/1 |
| 2018/0321756 A1 | 11/2018 | Mega | | |

FOREIGN PATENT DOCUMENTS

| | | |
|---|---|---|
| JP | 2013-72773 A | 4/2013 |
| JP | 2017-053720 A | 3/2017 |
| JP | 2017-097008 A | 6/2017 |

\* cited by examiner

ROTATION DETECTING DEVICE

CROSS-REFERENCE TO RELATED APPLICATIONS

The present application is based on Japanese patent application No. 2017-213622 filed on Nov. 6, 2017, the entire contents of which are incorporated herein by reference.

BACKGROUND

Technical Field

The present invention relates to a rotation detecting device and, in particular, to a rotation detecting device including a functionality to detect a failure of a detection sensor.

Related Art

In the related art, rotation detecting devices including two detection sensors have been proposed (e.g., JP 2017-53720 A).

The rotation detecting device includes an operation part configured to be rotationally operated by an operator; a rotating body configured to rotate with the operation part; slit parts and light-blocking parts alternately and successively provided along a circumferential direction of the rotating body, the slit parts being configured to allow light to pass therethrough, the light-blocking parts being configured to block light; a light-emitting part configured to generate light and two light-receiving parts configured to receive light from the light-emitting part and generate light-receiving signals, wherein, in a photointerrupter, the slit parts and the light-blocking parts are disposed between the light-emitting part and the two light-receiving parts, and the two light-receiving parts are disposed side by side along the circumferential direction of the rotating body; and a detector configured to, based on the combination pattern of Hi and Lo light-receiving signals that change in accordance with the positions of the slit parts and the light-blocking parts of the two light-receiving parts, detect a direction of rotation of the operation part and an amount of the rotation of the operation part. When a rotation speed of the operation part based on the amount of rotation reaches or exceeds a threshold value set in advance, the detector stops performing detection of the direction of rotation and the amount of rotation for a predetermined period of time set in advance or for a period of time until detecting a change in the direction of rotation of the operation part including stopping of rotation, or assuming that the direction of rotation of the operation part is one direction, detects the amount of rotation by using

SUMMARY

The rotation detecting device of JP 2017-53720 A detects the direction of rotation of the operation part and the amount of rotation of the operation part, based on the pattern of combinations of light-receiving signals Hi and Lo of the two light-receiving parts. -receiving parts fails and the light-receiving signal Hi or Lo of the other of the light -receiving parts are being output, the rotation detecting device cannot determine whether the operation part is rotating in a predetermined manner and thus is unable to detect the presence or absence of a failure.

Accordingly, an object of the invention is to provide a rotation detecting device configured to detect a failure.

[1] To achieve the object, a rotation detecting device is provided. The rotation detecting device includes a rotation operation part configured to be rotationally operated; a first detector configured to detect a rotation of the rotation operation part and output a first rotation detection signal; a second detector configured to detect the rotation of the rotation operation part and output a second rotation detection signal, with a predetermined phase difference with respect to the first rotation detection signal; a third detector configured to detect the rotation of the rotation operation part and output a third rotation detection signal, with each of a predetermined phase difference with respect to the first rotation detection signal of the first detector and a phase difference with respect to the second rotation detection signal of the second detector; and a controller configured to, based on the first rotation detection signal, the second rotation detection signal, and the third rotation detection signal, perform detection of a failure of the first detector, the second detector, or the third detector.

[2] The rotation detecting device according to [1] may be configured as follows. The controller may be configured to, based on at least two of the first rotation detection signal of the first detector, the second rotation detection signal of the second detector, and the third rotation detection signal of the third detector, detect a rotation operation state of the rotation operation part, and the controller may be configured to, in the rotation operation state, based on patterns of signal changes of the first rotation detection signal, the second rotation detection signal, and the third rotation detection signal, perform detection of a failure of the first detector, the second detector, or the third detector.

[3] The rotation detecting device according to [1] or [2] may be configured as follows. The third rotation detection signal may be a rotation detection signal having a reverse phase with respect to the first rotation detection signal of the first detector or the second rotation detection signal of the second detector.

[4] The rotation detecting device according to any one of [1] to [3] may be configured as follows. The controller may be configured to, based on each of the first rotation detection signal of the first detector and the second rotation detection signal of the second detector, detect a direction of the rotation of the rotation operation part and an amount of the rotation of the rotation operation part.

Advantageous Effect of the Invention

An aspect of the invention provides a rotation detecting device configured to detect a failure.

DESCRIPTION OF EMBODIMENTS

Embodiments of Present Invention

Configuration of Rotation Detecting Device 1

Figure 1A:
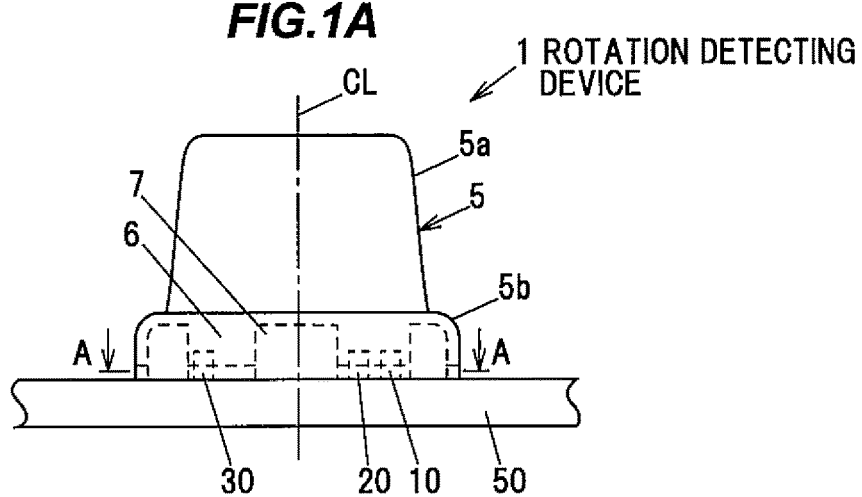
FIG. 1A is a schematic configuration diagram (side view) illustrating a schematic configuration of the rotation detecting device according to an embodiment of the invention.

A rotation detecting device 1, according to an embodiment of the invention, includes a rotation operation part 5, a first detector 10, a second detector 20, a third detector 30, and a controller 40. The rotation operation part 5 is configured to be rotationally operated. The first detector 10 is configured to detect a rotation of the rotation operation part 5 and output a first rotation detection signal. The second detector 20 is configured to detect the rotation of the rotation operation part 5 and output a second rotation detection signal, with a predetermined phase difference with respect to the first rotation detection signal. The third detector 30 is configured to detect the rotation of the rotation operation part 5 and output a third rotation detection signal, with each of a predetermined phase difference with respect to the first rotation detection signal of the first detector 10 and a phase difference with respect to the second rotation detection signal of the second detector 20. The controller 40 is configured to, based on the first rotation detection signal, the second rotation detection signal, and the third rotation detection signal, perform detection of a failure of the first detector 10, the second detector 20, or the third detector 30.

The rotation detecting device 1 can be used as a rotation detecting device for detecting the direction of rotation and the amount of rotation by a rotation operation. For example, the rotation detecting device 1 may be employed as a part of a device to which various adjustments are made by rotation operations performed by an operator. Examples of such a device include air conditioner adjustment devices and audio devices in vehicles.

Rotation Operation Part 5

Figure 1B:
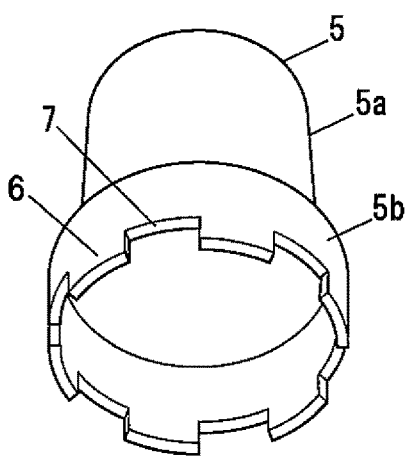
FIG. 1B is a perspective view of a rotation operation part, viewed from below.
Figure 1C:
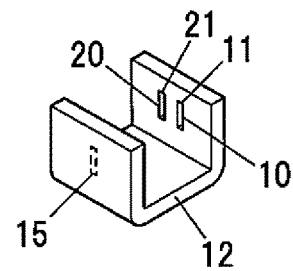
FIG. 1C is a perspective view of detectors, viewed from above.
Figure 1D:
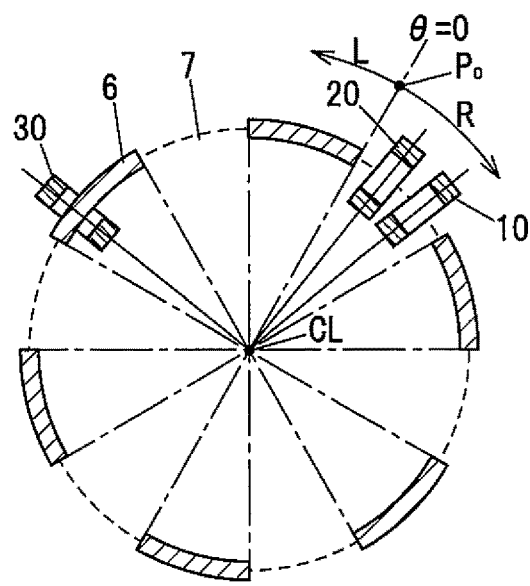
FIG. 1D is a cross-sectional view taken along A-A of FIG. 1A.

FIG. 1A is a schematic configuration diagram (side view) illustrating a schematic configuration of the rotation detecting device according to the embodiment of the invention. FIG. 1B is a perspective view of the rotation operation part, viewed from below. FIG. 1C is a perspective view of detectors, viewed from above. FIG. 1D is a cross-sectional view taken along A-A of FIG. 1A. As illustrated in FIGS. 1A and 1D, the rotation operation part 5 is disposed on a base 50 in such a manner that the rotation operation part 5 can be rotationally operated about a rotation center CL. For example, the rotation operation part 5 substantially includes a knob portion 5a and a rotation portion 5b. The knob portion 5a can be gripped by fingers. The rotation portion 5b is configured to rotate integrally with or in cooperation with the knob portion 5a.

As illustrated in FIG. 1B, the rotation operation part 5 includes light-blocking parts 6 and light-transmission parts 7 in the rotation portion 5b and thus has a similar functionality to the code disk of a rotary encoder. That is, the rotation operation part 5 blocks or transmits light entering the detectors (first detector 10, second detector 20, and third detector 30), which will be described later, and thus causes ON and OFF signals (Hi and Lo signals) to be generated. The rotation portion 5b includes six fins (light-blocking parts 6) configured by the light-blocking parts 6 and the light-transmission parts 7 formed repetitively at regular intervals of, for example, an angle of 30°.

Detectors (First Detector 10, Second Detector 20 and Third Detector 30)

The first detector 10, the second detector 20, and the third detector 30 each detect the rotation of the rotation operation part 5 and output a first rotation detection signal S1, a second rotation detection signal S2, and a third rotation detection signal S3, respectively. In the present embodiment, each of the detectors uses a photosensor configured to detect a change in reception of light in accordance with the passage of the light-blocking part 6 and the light-transmission part 7 that occurs when the rotation operation part 5 is rotationally operated.

Figure 2:
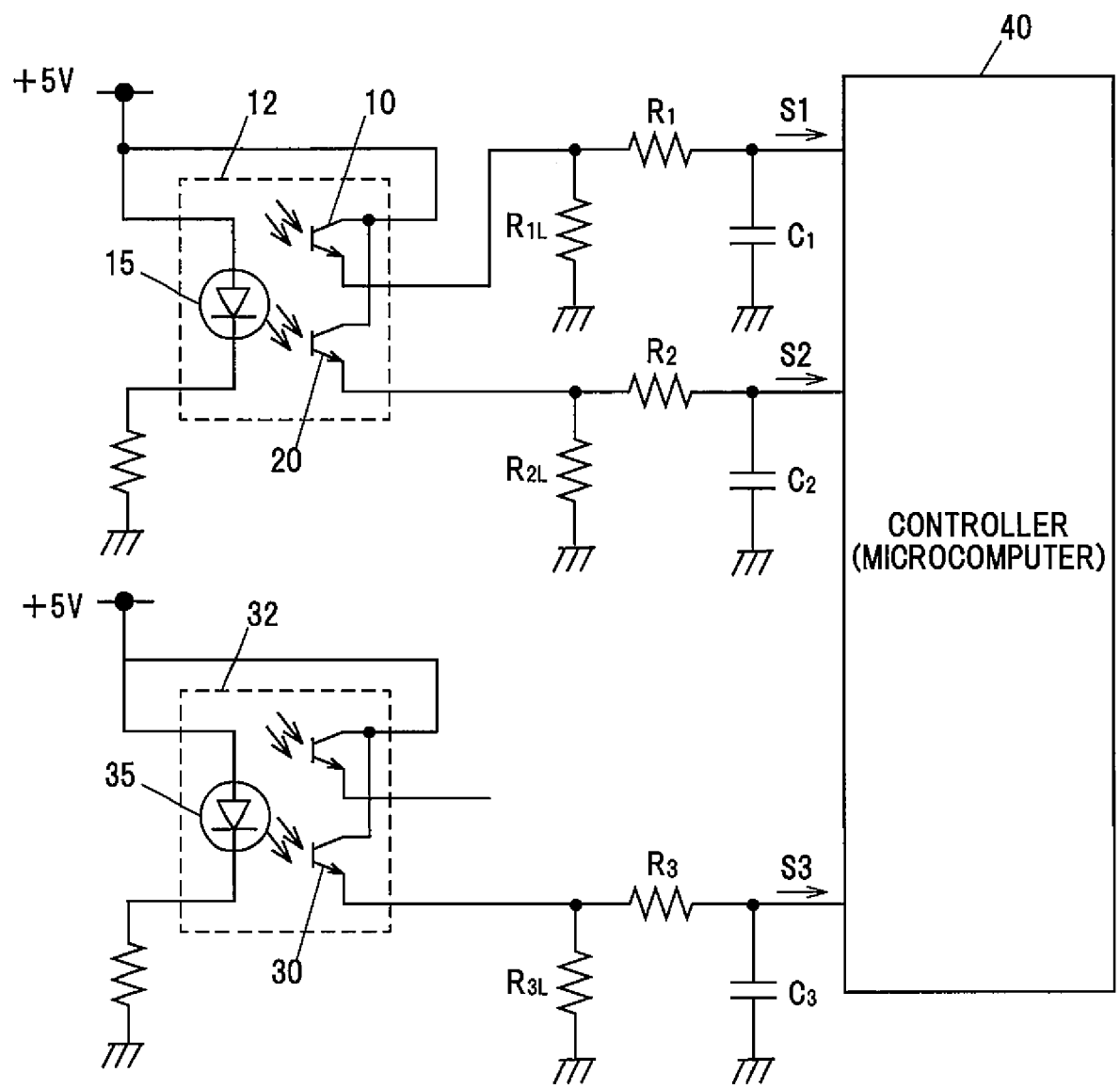
FIG. 2 is a circuit diagram illustrating a circuit configuration of the rotation detecting device according to the embodiment of the invention.

Specifically, the detectors use a transmission-type photosensor (photointerrupter) such as illustrated in FIG. 1C. In the present embodiment, as illustrated in FIG. 1C and FIG. 2, the first detector 10 and the second detector 20 are configured as a photosensor unit 12, which is a single unit, and use a light-emitting part 15, which is a common part. The third detector 30 uses a detector included in a photosensor unit 32 as the third detector 30, as illustrated in FIG. 2.

As illustrated in FIG. 1D, the first detector 10 and the light-emitting part 15 are disposed, with the rotation portion 5b (light-blocking parts 6 and light-transmission parts 7) therebetween, at positions such that Hi signals and Lo signals are output in association with the rotation of the rotation operation part 5. Likewise, the second detector 20 and the third detector 30 are disposed at positions such that Hi signals and Lo signals are output in association with the rotation of the rotation operation part 5.

In an initial state $P_0$ (θ=0), illustrated in FIG. 1D, the first detector 10 and the second detector 20 output Hi signals upon receiving light from the light-emitting part 15. The third detector 30 operates in a reverse phase with respect to the first detector 10 and the second detector 20 and thus does not receive light from a light-emitting part 35 and outputs a Lo signal. The first detector 10 and the second detector 20 are mounted with a predetermined space of, for example, an angle of 4°, therebetween.

FIG. 2 is a circuit diagram illustrating a circuit configuration of the rotation detecting device according to the embodiment of the invention. The first rotation detection signal S1 of the first detector 10 and the second rotation detection signal S2 of the second detector 20 are simultaneously input to the controller 40 via two channels. Further, the third rotation detection signal S3 of the third detector 30 is input to the controller 40 at the same timing as the first rotation detection signal S1 and the second rotation detection signal S2. Accordingly, the controller 40 determines the order in which switching between Hi and Lo signals occurs, among the signals input from the first detector 10, the second detector 20, and the third detector 30. With this determination, the controller 40 is able to detect the direction of rotation and the amount of rotation of the rotation operation part 5. In addition, detection of a failure of the first detector 10, the second detector 20, or the third detector 30 is made possible.

In FIG. 2, the first detector 10 is a photodiode that allows current to flow upon receiving light from the light-emitting part 15 (e.g., LED light). The output part of the first detector 10 is connected to the ground via a load resistor $R_{1L}$. In addition, the output part of the first detector 10 is connected to the controller 40 via a filter circuit including a resistor $R_1$ and a capacitor $C_1$. The second detector 20 and the third detector 30 have the same configuration as the first detector 10, and the output part of the second detector 20 and the output part of the third detector 30 are connected to the controller 40.

Controller 40

The controller 40 includes, for example, a microcomputer including a central processing unit (CPU) that carries out predetermined computations, processing executions, and the like in accordance with a stored program; a random access memory (RAM) and a read only memory (ROM), which are semiconductor memories; and the like. A program for operations of the controller 40 and various parameters, for example, are stored in the ROM. Further, the controller 40 includes, for example, an interface part through which input and output are configured to be performed to and from various devices.

Figure 3:
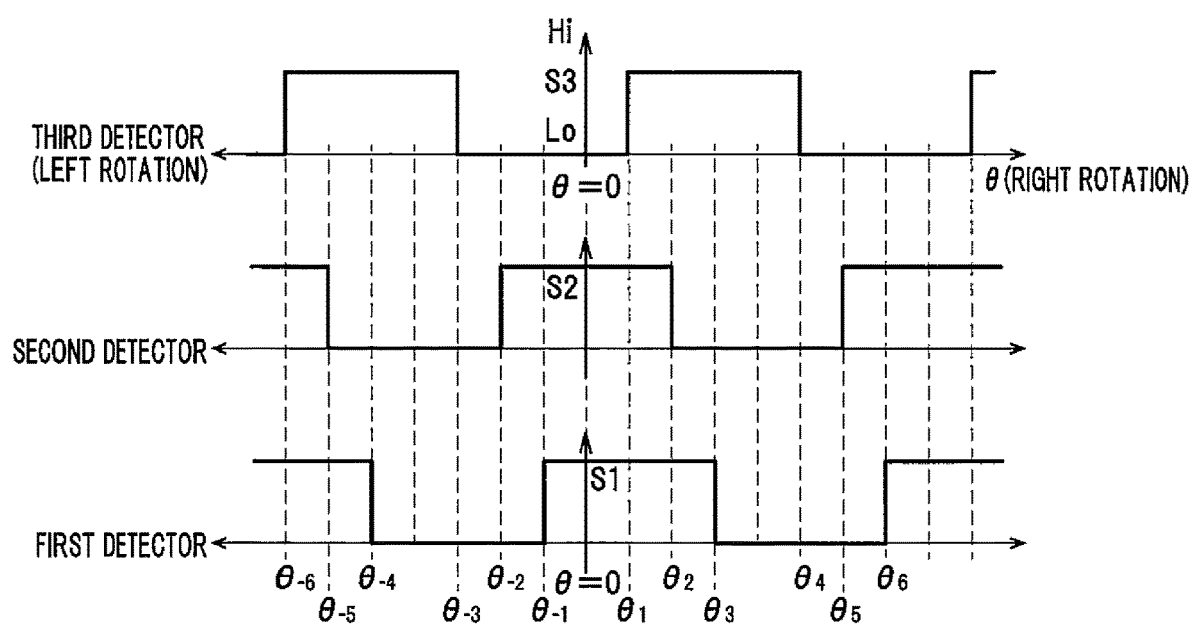
FIG. 3 illustrates rotation detection signals (Hi or Lo output signals) of a first detector, a second detector, and a third detector. The rotation detection signals are illustrating output in the case that the rotation operation part is rotationally operated toward the right or toward the left, with the initial position (θ=0) being the center.

FIG. 3 illustrates rotation detection signals S1, S2, S3 (Hi or Lo output signals) of the first detector 10, the second detector 20, and the third detector 30, respectively. The rotation detection signals are illustrating output in the case that the rotation operation part is rotationally operated toward the right (R direction indicated in FIG. 1D) or toward the left (L direction indicated in FIG. 1D), with the initial position ($\theta=0$) being the center.

In FIG. 3, in the initial state $P_0$ ($\theta=0$), the first detector 10 and the second detector 20 output Hi signals upon receiving light from the light-emitting part 15. The third detector 30 operates in a reverse phase with respect to the first detector 10 and the second detector 20 and thus does not receive light from a light-emitting part 35 and outputs a Lo signal.

When the rotation operation part 5 is rotated to the right in the initial state $P_0$ ($\theta=0$), the state changes to a state, at $\theta=\theta_1$, in which the first detector 10 is Hi, the second detector 20 is Hi, and the third detector 30 is Hi from the state in which the first detector 10 is Hi, the second detector 20 is Hi, and the third detector 30 is Lo, as illustrated in FIG. 3. When the rotation operation part 5 is rotated further to the right, the state changes to a state, at $\theta=\theta_2$, in which the first detector 10 is Hi, the second detector 20 is Lo, and the third detector 30 is Hi. At $\theta=\theta_3$, the state changes to a state in which the first detector 10 is Lo, the second detector 20 is Lo, and the third detector 30 is Hi. As the rotation operation part 5 is further rotated to the right, the state changes to the following states. At $\theta=\theta_4$, the first detector 10 is Lo, the second detector 20 is Lo, and the third detector 30 is Lo. At $\theta=\theta_5$, the first detector 10 is Lo, the second detector 20 is Hi, and the third detector 30 is Lo. At $\theta=\theta_6$, the first detector 10 is Hi, the second detector 20 is Hi, and the third detector 30 is Lo.

As described above, in the case that the first detector 10, the second detector 20, and the third detector 30 are operating normally, when the rotation operation part 5 is rotationally operated toward the right, the signal changes (from Hi to Lo or from Lo to Hi) in the first detector 10, the second detector 20, and the third detector 30 occur in the following order: the third detector 30, the second detector 20, and the first detector 10.

When the rotation operation part 5 is rotated to the left in the initial state $P_0$ ($\theta=0$), the state changes to a state, at $\theta=\theta_{-1}$, in which the first detector 10 is Lo, the second detector 20 is Hi, and the third detector 30 is Lo from the state in which the first detector 10 is Hi, the second detector 20 is Hi, and the third detector 30 is Lo, as illustrated in FIG. 3. When the rotation operation part 5 is rotated further to the left, the state changes to a state, at $\theta=\theta_{-2}$, in which the first detector 10 is Lo, the second detector 29 is Lo, and the third detector 30 is Lo. At $\theta=\theta_{-3}$, the state changes to a state in which the first detector 10 is Lo, the second detector 20 is Lo, and the third detector 30 is Hi. As the rotation operation part 5 is further rotated to the left, the state changes to the following states. At $\theta=\theta_{-4}$, the first detector 10 is Hi, the second detector 20 is Lo, and the third detector 30 is Hi. At $\theta=\theta_{-5}$, the first detector 10 is Hi, the second detector 20 is Hi, and the third detector 30 is Hi. At $\theta=\theta_{-6}$, the first detector 10 is Hi, the second detector 20 is Hi, and the third detector 30 is Lo.

As described above, in the case that the first detector 10, the second detector 20, and the third detector 30 are operating normally, when the rotation operation part 5 is rotationally operated toward the left, the signal changes (from Hi to Lo or from Lo to Hi) in the first detector 10, the second detector 20, and the third detector 30 occur in the following order: the first detector 10, the second detector 20, and the third detector 30.

The configuration described above enables the controller 40 to determine whether the rotation operation part 5 is rotationally operated toward the right or is rotationally operated toward the left, by determining the order in which the reversal between Hi and Lo occurs, among the first rotation detection signal S1, the second rotation detection signal S2, and the third rotation detection signal S3, respectively input from the first detector 10, the second detector 20, and the third detector 30. That is, based on the patterns of the signal changes of the first rotation detection signal S1, the second rotation detection signal S2, and the third rotation detection signal S3, detection of a failure of the first detector 10, the second detector 20, or the third detector 30 is made possible. Additionally, by totaling the reversals between Hi and Lo of the first rotation detection signal S1, the second rotation detection signal S2, and the third rotation detection signal S3 by using a counter or the like, the amount of rotation can be calculated.

Operations of Detection of Rotation and Detection of Failure of Detectors through Controller 40

Figure 4A:
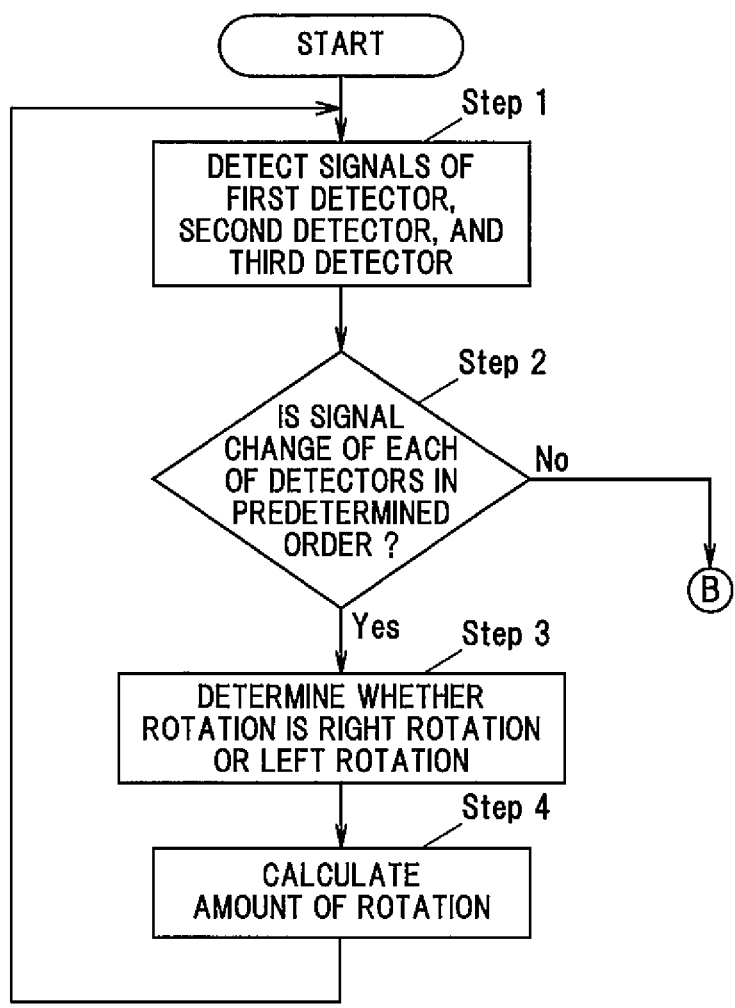
FIG. 4A is a flowchart illustrating a flow of an operation for detecting the direction of rotation and the amount of rotation, performed by the rotation detecting device according to the embodiment of the invention.
Figure 4B:
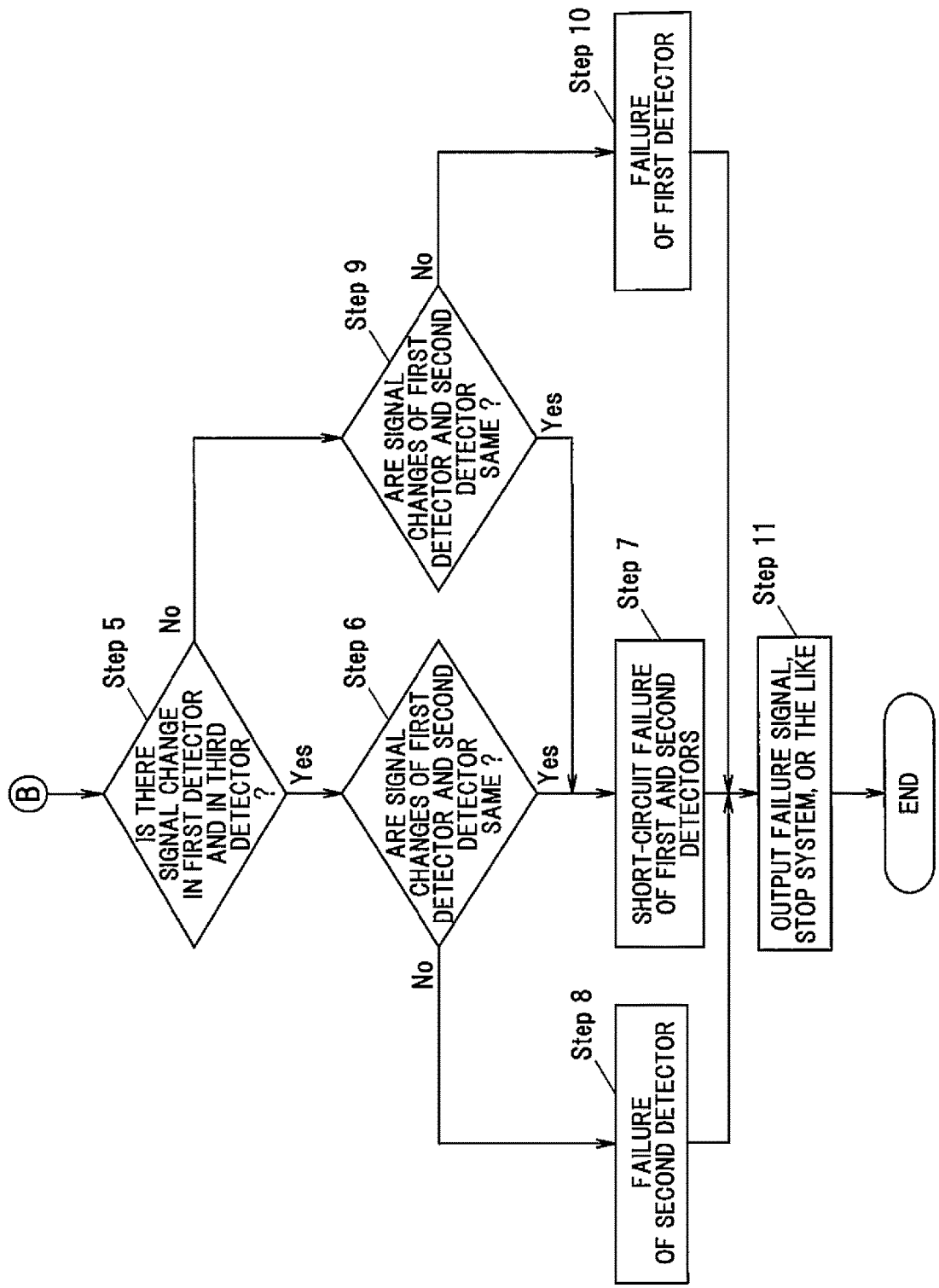
FIG. 4B is a continuation of the flowchart of FIG. 4A, after "No" is selected in Step 2, and thus is a flowchart illustrating a flow of an operation for detecting a failure, performed by the rotation detecting device according to the embodiment of the invention.

FIG. 4A is a flowchart illustrating a flow of an operation for detecting the direction of rotation and the amount of rotation, performed by the rotation detecting device 1 according to the embodiment of the invention. In normal operations, detection of rotation of the rotation operation part 5 is performed in accordance with the flowchart of FIG. 4A. FIG. 4B is a continuation of the flowchart of FIG. 4A, after "No" is selected in Step 2, and thus is a flowchart illustrating a flow of an operation for detecting a failure, performed by the rotation detecting device 1 according to the embodiment of the invention. In the following, operations for detection of rotation and detection of a failure performed by the rotation detecting device 1 of the embodiment of the invention will be described with reference to the flowcharts of FIGS. 4A and 4B. Note that the description is based on the assumption that, in the following operation, the third detector 30 has no failures.

(Step 1) The controller 40 detects the first rotation detection signal S1, the second rotation detection signal S2, and the third rotation detection signal S3 of the first detector 10, the second detector 20, and the third detector 30, respectively. The detection is performed successively every predetermined time period, and the rotation detection signals are acquired simultaneously in parallel, as illustrated in FIG. 2.

(Step 2) The controller 40 determines whether the signal changes in the first rotation detection signal S1, the second rotation detection signal S2, and the third rotation detection signal S3 of the each detector, namely, the first detector 10, the second detector 20, and the third detector 30, respectively, are in a predetermined order. In the case that the signal changes are in the predetermined order, the process proceeds to Step 3 (Step 2: Yes), and, in the case that the signal changes are not in the predetermined order, the process proceeds to Step 5 (Step 2: No).

(Step 3) The controller 40 determines whether the rotation operation performed on the rotation operation part 5 is a right rotation or a left rotation. In the case that the signal changes (from Hi to Lo or from Lo to Hi) in the first detector 10, the second detector 20, and the third detector 30 occur in the following order: the third detector 30, the second detector 20, and the first detector 10, the controller 40 determines that the rotation is in the right direction. On the other hand, in the case that the signal changes (from Hi to Lo or from Lo to Hi) in the first detector 10, the second detector 20, and the third detector 30 occur in the following order: the first detector 10, the second detector 20, and the third detector 30, the controller 40 determines that the rotation is in the left direction.

(Step 4) The controller 40 calculates the amount of rotation. By totaling the reversals between Hi and Lo of the first rotation detection signal S1, the second rotation detection signal S2, and the third rotation detection signal S3 by using a counter or the like, the controller 40 can calculate the amount of rotation. After the amount of rotation is calculated, the process returns to Step 1.

(Step 5) The controller 40 determines whether there is a signal change each in the first rotation detection signal S1 of the first detector 10 and in the third rotation detection signal S3 of the third detector 30. In the case that there is a signal change, the process proceeds to Step 6 (Step 5: Yes). In the case that there is no signal change, the process proceeds to Step 9 (Step 5: No).

(Step 6) The controller 40 determines whether the signal change of the first detector 10 and the signal change of the second detector 20 are the same. In the case that the signal changes are the same, the process proceeds to Step 7 (Step 6: Yes). In the case that the signal changes are not the same, the process proceeds to Step 8 (Step 6: No).

Figure 5A:
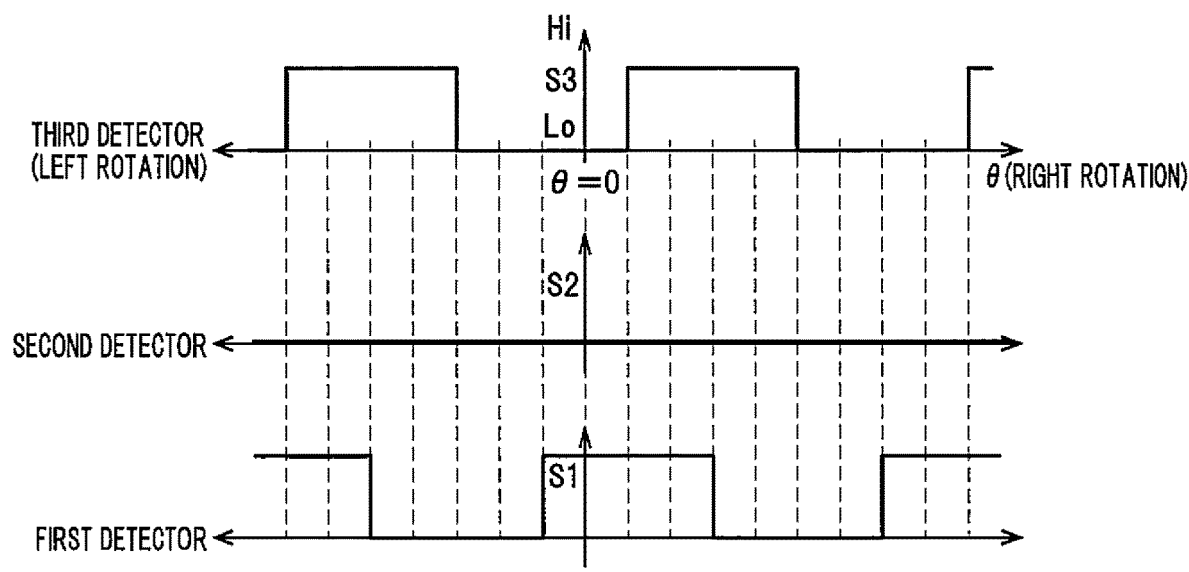
FIG. 5A is a diagram illustrating rotation detection signals of the first detector, the second detector, and the third detector that are output in the case that the second detector has a failure (stuck at the Lo level).
Figure 5B:
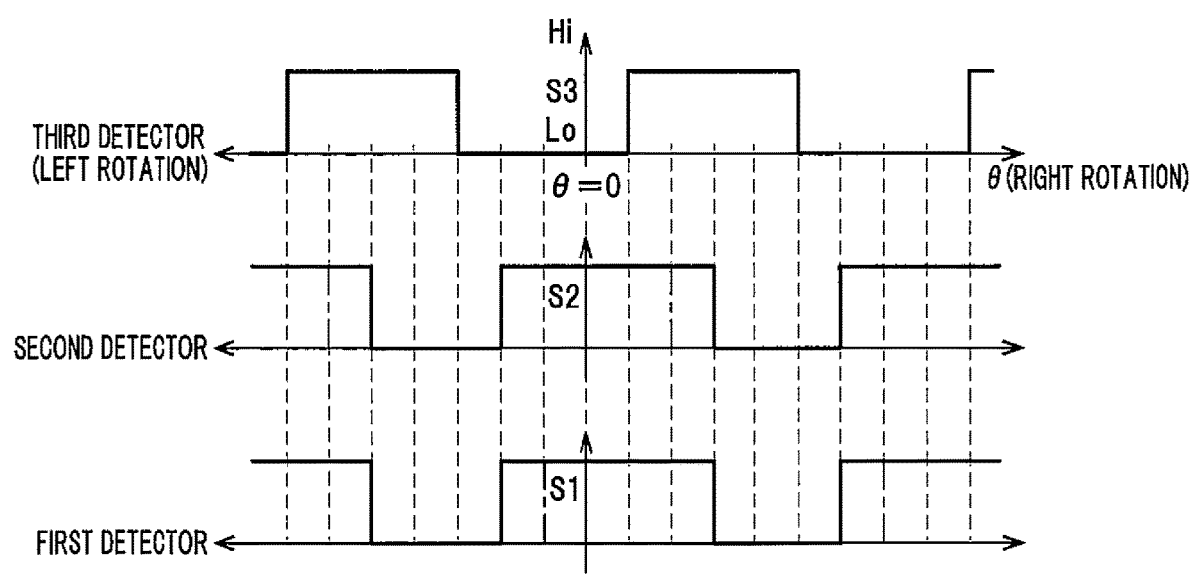
FIG. 5B is a diagram illustrating rotation detection signals that are output in the case that a short-circuit failure occurs, that is, a short circuit occurs between the first detector and the second detector.

(Step 7) The controller 40 determines that the first detector 10 and the second detector 20 have a short-circuit failure. Here, FIG. 5B is a diagram illustrating rotation detection signals that are output when a short-circuit failure occurs, that is, in the case that a short circuit occurs between the first detector and the second detector. That is, in the case that a short circuit occurs between the first detector 10 and the second detector 20, a wired-OR circuit is formed, and OR signals (sum signals) are output as the first rotation detection signal S1 of the first detector 10 and the second rotation detection signal S2 of the second detector 20. Thus, the first detector 10 and the second detector 20 have the same signal change. Thus, in the case that signals such as illustrated in FIG. 5B are detected, the controller 40 can determine that the first detector 10 and the second detector 20 have a short-circuit failure.

(Step 8) The controller 40 determines that the second detector 20 has a failure. As determined in Step 6, the case in which the signal change of the first detector 10 and the signal change of the second detector 20 are not the same is, for example, a case in which the second detector 20 has a failure (stuck at the Lo level), as illustrated in FIG. 5A. Additionally, in the case that the second detector 20 has a failure, there is a case in which the output value is not constant and thus there may be a case in which the signal is stuck at the Hi level. In either case, when the signal change of the first detector 10 and the signal change of the second detector 20 are not the same, the controller 40 can determine that the second detector 20 has a failure.

(Step 9) The controller 40 determines whether the signal change of the first detector 10 and the signal change of the second detector 20 are the same. In the case that the signal changes are the same, the process proceeds to Step 7 (Step 9: Yes). In the case that the signal changes are not the same, the process proceeds to Step 10 (Step 9: No).

(Step 10) The controller 40 determines that the first detector 10 has a failure. As determined in Step 9, the case in which the signal change of the first detector 10 and the signal change of the second detector 20 are not the same is a case in which the first detector 10 has a failure. Additionally, in the case that the first detector 10 has a failure, there is a case in which the output value is not constant and thus the signal is stuck at the Hi level or the Lo level. In either case, when the signal change of the first detector 10 and the signal change of the second detector 20 are not the same, the controller 40 can determine that the first detector 10 has a failure, as in Step 8.

(Step 11) The controller 40 may output a failure signal. Additionally, the controller 40 may stop the system. As a result, an improvement in the safety of the system can be expected.

Effect of Embodiment of Present Invention

A rotation detecting device 1, according to an embodiment of the invention, includes a rotation operation part 5, a first detector 10, a second detector 20, a third detector 30, and a controller 40. The rotation operation part 5 is configured to be rotationally operated. The first detector 10 is configured to detect a rotation of the rotation operation part 5 and output a first rotation detection signal. The second detector 20 is configured to detect the rotation of the rotation operation part 5 and output a second rotation detection signal, with a predetermined phase difference with respect to the first rotation detection signal. The third detector 30 is configured to detect the rotation of the rotation operation part 5 and output a third rotation detection signal, with each of a predetermined phase difference with respect to the first rotation detection signal of the first detector 10 and a phase difference with respect to the second rotation detection signal of the second detector 20. The controller 40 is configured to, based on the first rotation detection signal, the second rotation detection signal, and the third rotation detection signal, perform detection of a failure of the first detector 10, the second detector 20, or the third detector 30. This configuration enables determination of whether the rotation operation part 5 is rotating in a predetermined manner. Additionally, on the premise that the rotation operation part 5 is rotating, based on the patterns of the signal changes of the first rotation detection signal S1, the second rotation detection signal S2, and the third rotation detection signal S3, detection of a failure of the first detector 10, the second detector 20, or the third detector 30 is made possible.

Figure 6:
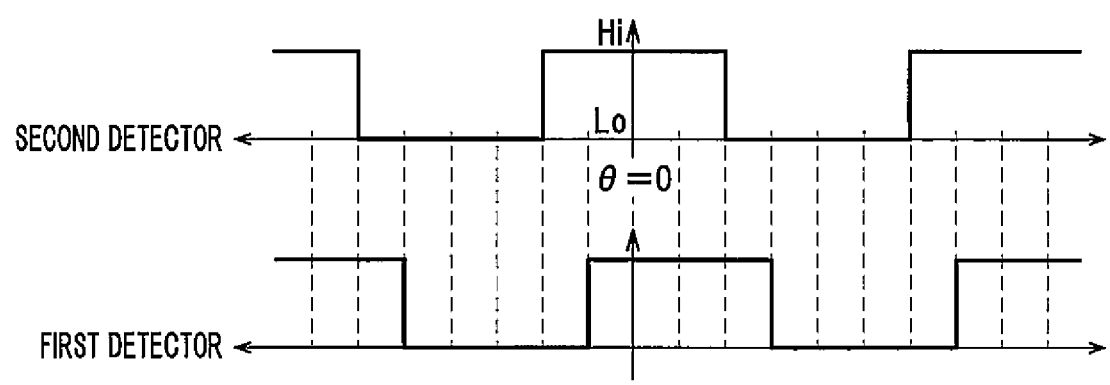
FIG. 6 is a diagram for describing a related-art rotation detecting device including two detectors illustrating rotation detection signals (Hi or Lo output signals) thereof.

Here, FIG. 6 is a diagram for describing a known rotation detecting device including two detectors illustrating rotation detection signals (Hi or Lo output signals) thereof, presented as a comparative example. The configuration corresponds to the configuration of the rotation detecting device 1 according to the present embodiment except that the third detector 30 is not included.

With the configuration, including a first detector and a second detector, even when, for example, the signal of the first detector is continuously output and no signal is output from the second detector, it is impossible to determine that the second detector has a failure. The reason is that it is impossible to determine whether the rotation operation part is being rotationally operated or is repetitively operated at or near the switching point of the first detector.

However, addition of the third detector makes it possible to determine that the rotation operation part is rotating, when, for example, signals of the first detector and the third detector are output. Based on the premise that the rotation operation part is rotating, a determination that there is no output from the second detector can be made, and thus a determination of a failure can be made.

As described above, the rotation detecting device 1 according to the present embodiment includes the first detector 10, the second detector 20, and the third detector 30 and thus is able to determine whether the rotation operation part 5 is rotating in a predetermined manner. Consequently, the rotation detecting device, capable of detecting a failure, can be provided. Additionally, the rotation detecting device 1 may output a failure signal and may stop the system. As a result, an improvement in the safety of the system can be expected.

Although embodiments of the present invention have been described above, these embodiments are merely examples and the invention according to claims is not to be limited thereto. Novel embodiments and modifications thereof may be implemented in various other forms, and various omissions, substitutions, changes, and the like can be made without departing from the spirit and scope of the present invention.

For example, in the description above, the first detector 10 and the second detector 20 are configured as the single photosensor unit 12, as illustrated in FIGS. 1C and 2, and use the common light-emitting part 15. However, the first detector 10 and the second detector 20 may be each configured to be an independent detector and disposed. Additionally, in the description above, the third detector 30 operates in a reverse phase with respect to each of the first detector 10 and the second detector 20. However, a configuration in which the third detector 30 operates in the same phase is also possible provided that the rotation detection signals of the first detector 10, the second detector 20, and the third detector 30 are output in a predetermined order.

In addition, all the combinations of the features described in these embodiments are not necessarily needed to solve the technical problem. Further, these embodiments and modifications are included within the spirit and scope of the invention and also within the invention described in the claims and the scope of equivalents thereof.

REFERENCE SIGNS LIST

1 Rotation detecting device
5 Rotation operation part
5*a* Knob portion
5*b* Rotation portion
6 Light-blocking part
7 Light-transmission part
10 First detector
20 Second detector
30 Third detector
12 Photosensor unit
15 Light-emitting part
32 Photosensor unit
35 Light-emitting part
40 Controller
50 Base

The invention claimed is:

1. A rotation detecting device comprising:
 a rotation operation part configured to be rotationally operated by an operator;
 a first detector configured to detect a rotation of the rotation operation part and output a first rotation detection signal;
 a second detector configured to detect the rotation of the rotation operation part and output a second rotation detection signal, with a predetermined phase difference with respect to the first rotation detection signal;
 a third detector configured to detect the rotation of the rotation operation part and output a third rotation detection signal, with each of a predetermined phase difference with respect to the first rotation detection signal of the first detector and a phase difference with respect to the second rotation detection signal of the second detector, and;
 a controller configured to, based on the first rotation detection signal, the second rotation detection signal, and the third rotation detection signal, perform detection of a failure of the first detector, the second detector, or the third detector,
 wherein the controller is configured to, based on at least two of the first rotation detection signal of the first detector, the second rotation detection signal of the second detector, and the third rotation detection signal of the third detector, detect a rotation operation state of the rotation operation part,
 wherein the controller is configured to, in the rotation operation state, based on patterns of signal changes of the first rotation detection signal, the second rotation detection signal, and the third rotation detection signal, perform detection of a failure of the first detector, the second detector, or the third detector,
 wherein the rotation operation part includes a knob portion configured to be gripped by the fingers of an operator and rotated, and an annular rotation portion integrally formed with and circumscribing the periphery of the knob portion that includes light-blocking parts and light transmission parts configured to rotate integrally or cooperatively with the knob portion, and
 wherein the first, second, and third detectors detect the rotation of the rotation operation part by detecting light that has been transmitted or blocked by the light-blocking parts and light transmission parts, wherein the first to third detectors comprise at least two light-emitting parts, each of which is positioned adjacent to the light-blocking parts and light transmission parts of the annular rotation portion, and three light-receiving parts.

2. The rotation detecting device according to claim 1, wherein the third rotation detection signal is a rotation detection signal having a reverse phase with respect to the first rotation detection signal of the first detector or the second rotation detection signal of the second detector.

3. The rotation detecting device according to claim 2, wherein the controller is configured to, based on each of the first rotation detection signal of the first detector and the second rotation detection signal of the second detector, detect a direction of the rotation of the rotation operation part and an amount of the rotation of the rotation operation part.

4. The rotation detecting device according to claim 1, wherein the controller is configured to, based on each of the first rotation detection signal of the first detector and the second rotation detection signal of the second detector, detect a direction of the rotation of the rotation operation part and an amount of the rotation of the rotation operation part.

5. The rotation detecting device according to claim 1, wherein the first to third detectors each comprise a light-emitting part and a light-receiving part, and wherein the rotation operation part comprises a light-transmission part to transmit a light output from the light-emitting part and a light-blocking part to block the light.

6. The rotation detecting device according to claim 5, wherein the light-emitting part and the light-receiving part are integrally formed with each other, and wherein the light-transmission part and the light-blocking part of the rotation operation part are put between the light-emitting part and the light-receiving part.

7. The rotation detecting device according to claim 5, wherein the first and second detectors comprise a single common light-emitting part, and wherein the third detector comprises a light-emitting part different from the common light-emitting part.

8. The rotation detecting device according to claim 7, wherein, in an initial state, the first and second detectors output the first and second rotation detection signals, respectively, that are in a reverse phase to the third rotation detection signal from the third detector.

9. The rotation detecting device according to claim 7, wherein, in an initial state, the first and second detectors output the first and second rotation detection signals, respectively, that are in a same phase as the third rotation detection signal from the third detector.

10. The rotation detecting device according to claim 7, wherein the controller is configured to detect both a direction of rotation and to detect a failure of the first, second, or third detector within less than a single rotation of the rotation operation part by the operator.

11. The rotation detecting device according to claim 1 further comprising a base that rotatably supports the rotation operation part, wherein the light-emitting part and a light-receiving parts of the first to third detectors are unitized by at least two separate unitizing members that are connectable to the base.

12. The rotation detecting device according to claim 11, wherein the light-emitting parts and light-receiving parts of the first and second detectors are unitized by a unitizing member and the light-emitting part and light-receiving part of the third detector is unitized by a second unitizing member.

13. The rotation detecting device according to claim 11, wherein the light-emitting parts and light-receiving parts of the first and second detectors are configured to simultaneously receive light through a single one of the light-transmission parts of the annular rotation portion, and the light-emitting part and the light-receiving part of the third detector are configured to simultaneously receive light through a different one of the light-transmission parts of the annular rotation portion than the single one.

14. The rotation detecting device according to claim 1, wherein the light-emitting parts of the first to third detectors are configured to transmit their light substantially radially toward the light-transmission part and the light-blocking part of the rotation operation part.

* * * * *